(12) United States Patent
Geraci et al.

(10) Patent No.: US 9,465,666 B2
(45) Date of Patent: Oct. 11, 2016

(54) GAME ENGINE AND METHOD FOR PROVIDING AN EXTENSION OF THE VSIPL++ API

(75) Inventors: James R. Geraci, Tokyo (JP); Erek Speed, Tokyo (JP); Alexander Chia, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 48 days.

(21) Appl. No.: 13/094,339

(22) Filed: Apr. 26, 2011

(65) Prior Publication Data

US 2011/0276970 A1 Nov. 10, 2011

(30) Foreign Application Priority Data

May 6, 2010 (JP) .................................. 2010-106825

(51) Int. Cl.
  G06F 9/46 (2006.01)
  G06F 9/455 (2006.01)
  G06F 9/50 (2006.01)
(52) U.S. Cl.
  CPC ........... G06F 9/5044 (2013.01); G06F 9/5055 (2013.01); A63F 2300/60 (2013.01)
(58) Field of Classification Search
  None
  See application file for complete search history.

(56) References Cited

U.S. PATENT DOCUMENTS

| 2007/0182732 | A1* | 8/2007 | Woop et al. | 345/420 |
|---|---|---|---|---|
| 2008/0021679 | A1* | 1/2008 | Bleiweiss et al. | 703/2 |
| 2009/0225081 | A1* | 9/2009 | Keller et al. | 345/426 |
| 2009/0313449 | A1* | 12/2009 | Kepner et al. | 711/165 |
| 2010/0079452 | A1 | 4/2010 | Zhou et al. | |
| 2011/0025682 | A1* | 2/2011 | Keller et al. | 345/418 |
| 2012/0169728 | A1* | 7/2012 | Mora | 345/419 |

FOREIGN PATENT DOCUMENTS

| WO | 2008/016515 | 2/2008 | |
| WO | 2011/035800 | * 3/2011 | ............. G06T 15/06 |

OTHER PUBLICATIONS

William Thies et al., "Streamlt: a Lauguage for Streaming Applications", Tech. Rep. Massachusetts Institute of Technology, Aug. 2001, 17 pages.

Bradford L. Chamberlain et al., "Parallel Programmability and the Chapel Language", International Journal of High Performance Computing Applications 21, 3, Aug. 2007, pp. 291-312.

(Continued)

Primary Examiner — Abdullah Al Kawsar
Assistant Examiner — Bradley Teets
(74) Attorney, Agent, or Firm — Greenblum & Bernstein, P.L.C.

(57) ABSTRACT

A system includes a memory, a graphics processor, and a processor. The memory stores a control program that includes an extension of an application programming interface. The graphics processor includes multiple computational units. The processor executes the control program, with the control program causing the processor to obtain data from the memory. The data specifies a first function and is intended to execute on the multiple computational units. The control program further causes the processor to create at least one map for assigning computational tasks for the first function across the multiple computational units. A part of the data associated with each of the computational tasks is stored to the respective multiple computational units that are assigned to execute the computational tasks.

14 Claims, 6 Drawing Sheets

(56) References Cited

OTHER PUBLICATIONS

Michael D. McCool, "Data-Parallel Programming on the Cell BE and the GPU using the RapidMind Development Platform", RapidMind Inc., Presented at the GSPx Multicore Applications Conference, Santa Clara, Oct. 31, 2006, 9 pages.
Wanda Meloni, "The BREIF—2009 Ups and Downs", M2 Research, Jan. 5, 2010.
Michael Weiland, "Chapel, Fortress and X10: novel languages for HPC", Tech. Rep., EPCC, The University of Edinburgh, Oct. 10, 2007, 14 pages.
Bradford L. Chamberlain et al., "The Case for High-Level Parallel Programming in ZPL", IEEE Computational Science and Engineering 5, 3, Sep. 1998, pp. 76-86.
Philippe Charles et al., "X10: An Object-Oriented Approach to Non-Uniform Cluster Computing", ACM Special Interest Group on Programming Languages, 2005, pp. 519-538.
CodeSourcery, LLC, "VSIPL++ Specification—Parallel Specification", Georgia Tech Research Corporation, Apr. 7, 2006, 59 pages.
Andrei Dobra, "Ubisoft: Game Development Will Cost $60 Million in the Future", Web, Jun. 18, 2009, 1 page.
James Lebak et al., "Parallel VSIPL++: An Open Standard Software Library for High-Performance Parallel Signal Processing", Proceedings of the IEEE, vol. 93, No. 2, Feb. 2005, pp. 313-330.
Hahn Kim et al., "Multicore Software Technologies", [[A survey]], IEEE Signal Processing Magazine 26, 6, Nov. 2009, pp. 80-89.
Summary of Michael McCool et al., "Meta Programming GPUs with Sh. A.K. Peters, Ltd.", 2004, 1 page (document unavailable).

\* cited by examiner

GAME ENGINE AND METHOD FOR PROVIDING AN EXTENSION OF THE VSIPL++ API

TECHNICAL FIELD

The present invention is directed to a system and a method that extends the VSIPL++ API with a ray/triangle intersection function and makes data maps distribute across architecture's compute units instead of just its processors. The present invention further relates to a new nested input data streaming pattern to the VSIPL++API.

BACKGROUND OF THE INVENTION

Game code is becoming increasingly complex, for example, Unreal Engine 3 has between 2 to 3 million lines of code. At the same time, game development costs are sky rocketing. Seventh generation console game development costs are almost 10 million USD for a single platform. This is between double to triple development costs for games on prior generation consoles. Costs double or triple again for a cross platform title to almost 30 million USD. Ubisoft's CEO and Chairman Yves Guillemot is expecting development costs to rise to about 60 million USD. Some AAA titles already exceed this amount.

One of the major drivers for this increase in cost and complexity is the dramatic increase in complexity of the hardware upon which the game is deployed. Processors have gone from a single core to 3 cores of the Xbox 360's Xenon to 9 cores in the Playstation (trademark) 3's Cell Broadband Engine (CBE). The core count is projected to grow even more in future generations of game consoles. For 7th generation gaming systems, single-threaded code had to be replaced by multi-threaded code. With it may bring problems related to parallel computing like deadlock, timing, and synchronization errors. These programming traps make scaling past the small number of cores on today's game machines presents an even greater challenge.

Furthermore, each of parallel architecture is extremely different from the other, making cross platform deployment difficult. This cross platform deployment includes not only PS3 to Xbox360 type issues, but also re-releasing games written for a current generation consoles on a handheld console or other platform many years down the road. An example of this is Final Fantasy. It was released in 1987 on the Nintendo Entertainment System (NES), but it is now available for the Playstation Portable (PSP) and other platforms. The PSP's MIPS R4000 based CPU is significantly more advanced and different from the NES's Ricoh 2A03.

Parallel Language Efforts

The video game development community is not alone in its struggle with the dramatic increase in computation demand and complexity, so much effort has already gone into developing programming languages to help alleviate some of the pitfalls associated with parallel programming and thereby increase productivity of parallel systems. In the high performance computing community, DARPA has been sponsoring the High Productivity Computer Systems (HPCS) program since 2002. This program seeks to increase program productivity where productivity is defined as, "a combination of performance, programmability, portability and robustness". Fortress from Sun, X10 from IBM, and Chapel from Cray are all languages that have been developed as part of the HPCS effort. All three languages use the global view programming model. However, each language is very different from the other languages. Fortress is an interpreted language whose syntax tries to mimic the syntax of mathematical expressions. X10 is a subset of Java with added parallelism supporting constructs. Chapel is a compiled language that borrows heavily from C, Fortran, Java and Ada.

The real time embedded signal processing community started work in 1996 on an industry standary library for vector, signal and image processing. This produced the Vector, Signal and Image Processing Library (VSIPL) API in 1999, VSIPL++ (Object-Oriented VSIPL) in 2005 and parallel VSIPL++ in 2006. This API is maintained by the High Performance Embedded Computing Software Initiative (HPEC-SI) which is a consortium of industry, academic and government groups. VSIPL++ is expounded on in Section 2.

The academic community has produced high level parallel programming languages like ZPL and domain specific programming languages like Sh. ZPL is a high level programming language that allows convenient manipulation of arrays. ZPL is based on an underlying abstract machine that represents many features common to among parallel machines. These two ideas abstract away the parallelism. This requires programmer to implement communication/synchronization code. This in turn makes ZPL programs concise and easy to debug. Sh was developed as a flexible shader language at the University of Waterloo, and StreaMIT was developed at MIT to help program streaming applications.

Finally, the graphics community has produced a number of shader languages that have been extended into more flexible general purpose programming languages. These include Nvidia's CUDA, Open Computing Language (OpenCL) from the Khronos Group, and CT/RapidMind which grew out of Sh. Both CUDA and OpenCL are lower level languages that abstract away some parts of the hardware in order to simplify parallel programming. CUDA works on Nvidia's graphics while OpenCL can be used on any both AMD and Nvidia graphics hardware and on the x86.

CT/RapidMind is a higher level language originated as a commercially available and supported version of the Sh programming language. It features a Single Program Multiple Data (SPMD) model of computation. Its key innovation is its "Program" type. These are analogous to shaders on the GPU. "Program"s can be run in two different modes. "Immediate Mode" immediately runs the program. "Retained Mode" allows one to capture the state of a "Program" and run it at a later time. This feature allows the collection of multiple "programs" into a mega "program." It has its own compiler and runtime. It features "tight binding" which means that changes to the input to a program will not affect the output and "loose binding" which means that changes in the input will appear at the output. It also has scatter-gather primitives.

The specification of US patent application no. 2010/0079452 discloses photon mapping on graphics hardware using kd-trees. The pamphlet of WO 2008/016515 discloses the map in respect of VSIP++. These documents and following documents are incorporated herein by reference in its entirety.

CITATION LIST

Patent Literature

Patent literature 1: US patent application no. 2010/0079452
Patent literature 2: WO 2008/016515 discloses the map in respect of VSIP++

Non Patent Literature

Non Patent literature 1: BILL THIES, M. K., AND AMARASINGHE, S. 2001. Stream it: A language for streaming applications. Tech. rep., Massachusetts Institute of Technology, August.

Non Patent literature 2: B. L. CHAMBERLAIN, D. CALLAHAN, H. Z. 2007. Parallel programmability and the chapel language. International Journal of High Performance Computing Applications 21, 3 (August), 291-312.

Non Patent literature 3: BRADFORD L. CHAMBERLAIN, SUNG-EUN CHOI, E. C. L. C. L. L. S. W. D. W. 1998. IEEE Computational Science and Engineering5, 3 (September), 76-86.

Non Patent literature 4: CHARLES, P., GROTHOFF, C., SARASWAT, V., DONAWA, C., KIELSTRA, A., EBCIOGLU, K., VON PRAUN, C., AND SARKAR, V. 2005. X10: an object-oriented approach to non uniform cluster computing. ACM Special Interest Group on Programming Languages, 519-538.

Non Patent literature 5: CODESOURCERY, L., 2006. Vsipl++ specification parallel specification. Web, April.

Non Patent literature 6: DOBRA, A., 2009. Ubisoft: Game development will cost $60 million in the future. Web, June.

Non Patent literature 7: JAMES LEBAK, JEREMY KEPNER, H. H. E. R. 2005. Parallel vsipl++: An open standard software library for high performance parallel signal processing. Proceedings of the IEEE 93, 2 (February), 313-330.

Non Patent literature 8: KIM, H., AND BOND, R. 2009. Multi core software technologies. IEEE Signal Processing Magazine 26, 6 (November), 80-89.

Non Patent literature 9: MCCOOL, M., AND TOIT, S. D. 2004. Meta programming GPUs with Sh. A. K. Peters, Ltd.

Non Patent literature 10: MCCOOL, M. D. 2006. Data-parallel programming on the cell be and the bpu using the rapidmind development platform.

Non Patent literature 11: MELONI, W., 2010. The brief—2009 ups and downs. Web, January. WEILAND, M. 2007. Chapel, fortress and x10: novel languages for hpc. Tech. rep., EPCC, The University of Edinburgh, October.

SUMMARY OF INVENTION

Technical Problem

An object of the present invention is to provide a system and a method for a C++ based extension of the parallel VSIPL++ API that consists of a basis of game engine related operations, such as ray/triangle intersection and uses map to spread data across multiple computational units which separates functionality from underlying parallel implementation allowing for easier development and cross platform deployment.

Solution to Problem

The first aspect of the present invention relates to a system 101 for a game engine. The system 101 comprises a memory 102, multiple computational units 103; and a map means 104 for creating a map or a plurality of maps. The memory 102 may comprise various types of memories, including database, RAM, ROM, and hard disk.

The map means 104 obtains data from the memory 102. The data specify a first functionality and the data are intended to execute on the multiple computational units 103. The map means 104 creates the map or a plurality of maps for assigning computational tasks for the first functionality by spreading the data across the multiple computational units 103. The assigning comprises storing a part of the data associated with the tasks to the respective computational units that will execute the tasks.

The data are "assigned" to computational units in the sense that the computational units now have responsibility for performing computational operations on that data. This data can remain in main memory as long as it likes. Each computational unit decides when it will bring the data onto chip and operate on the data.

One embodiment of the first aspect of the invention is that the data specify a first functionality and a second functionality. In other words, the system deals with a plurality of functionalities. The map means 104 creates the map or a plurality of maps for assigning computational tasks for the first functionality and the second functionality by spreading the data across the multiple computational units 103. The assigning comprises storing a part of the data associated with the tasks to the respective computational units that will execute the tasks.

The second aspect of the present invention relates to a method for mapping data for a multiple computational units system. The system comprises multiple computational units 103 especially for game. The method comprises the following steps. The method comprises the step for obtaining data from memory 102. The data specify a first functionality and the data are intended to execute on the multiple computational units system. The method comprises the step for creating a map or a plurality of maps for assigning computational tasks for the first functionality by spreading the data across the multiple computational units.

One embodiment of the second aspect of the invention is that the data specify a first functionality and a second functionality.

When the system of the present invention uses the GPU for computation, the system are using the SAME computational units for its work as would be used for rendering images to the screen. This is inefficiency, but it is one that everyone doing GPU computation has to deal with. The maps of the present invention map the data for actual computation across the actual computational units. These computational units could be from any number of different computational architecture families. For example, they could be x86 processors, the streaming units on a Graphics Processing Unit, or the Synergistic Processor Elements on a Cell Broadband Engine.

The present invention further provides a ray/triangle intersection function to the VSIPL++ API. This is significant as it is the basis function for many things in rendering and physics. This function can be run in parallel across multiple x86 processors (or PowerPC processors), or on the Cell Broadband Engine (PS3) across multiple Synergistic Processor Elements, or on a GPU using all of the streaming/CUDA units of the GPU. This function can be used to implement multiple different types of rendering algorithms. Adding the ray/triangle intersection function to the VSIPL++ API required adding a new data streaming patterns to the API. Data streaming patterns are sometimes called "temporal maps." The "temporal map" allows the nested streaming of two different data streams.

Advantageous Effects of Invention

The present invention may provide a system and a method for a C++ based extension of the parallel VSIPL++ API that consists of a basis of game engine related operations, such as ray/triangle intersection and uses map to spread data across multiple computational units which separates functionality from underlying parallel implementation allowing for easier development and cross platform deployment.

To the best of inventors' knowledge, this is the first time anyone has been able to write a Monte Carlo path tracer in C++ and run it on 3 extremely different hardware architectures without changing a single line of code.

DESCRIPTION OF EMBODIMENTS

Figure 1:
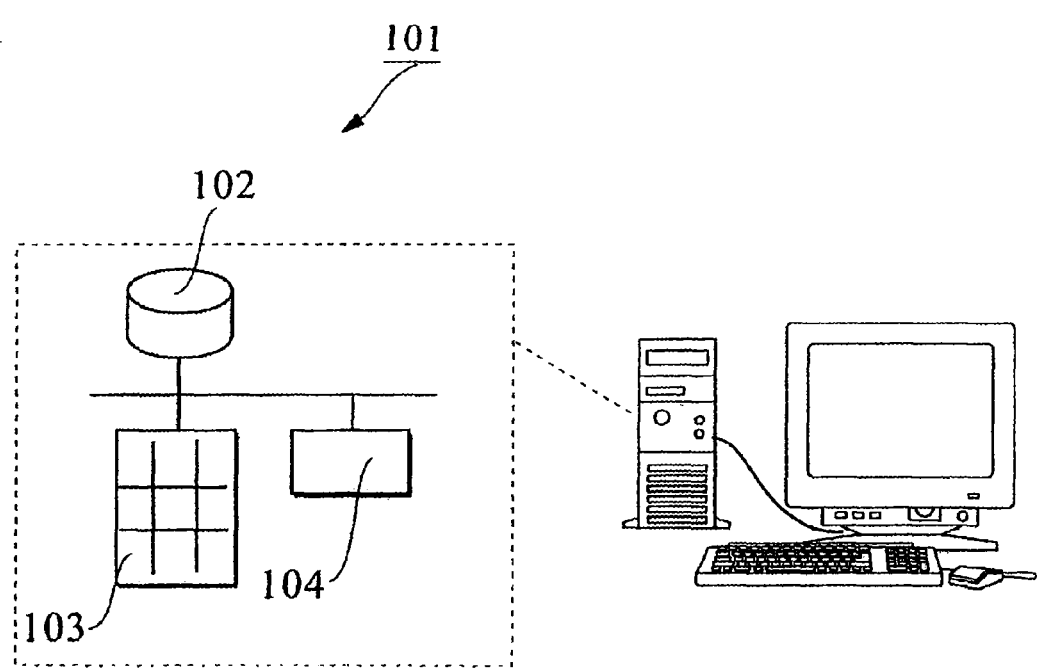
FIG. 1 shows a block diagram of the present invention.

The present invention introduces the ray/triangle intersection operation to the VSIPL++ API. This operation is essential to the games community as it is the basis for many global illumination algorithms and also is a specialization of the object/object intersection used in physics engines. The present invention uses this operation to demonstrate the API's ability to implement useful programs by implementing a Monte Carlo path tracer that can be run four different architectures without changing any code. In each case the present invention distributes the eye-rays across the processors and has each processor test against the triangles. In doing so, the present invention significantly modify VSIPL++'s data maps to map to a system's computational units instead of its processors as is done presently by the signal processing community. The present invention also introduces a nested data streaming pattern into the API to handle the testing of all triangles against each ray.

The first aspect of the present invention relates to a system 101 for a game engine. The system 101 comprises a memory 102, multiple computational units 103; and a map means 104 for creating a map or a plurality of maps. The memory 102 may comprise various types of memories, including database, RAM, ROM, and hard disk.

The map means 104 obtains data from the memory 102. The data specify a first functionality and the data are intended to execute on the multiple computational units 103. The map means 104 creates the map or a plurality of maps for assigning computational tasks for the first functionality by spreading the data across the multiple computational units 103. The assigning comprises storing a part of the data associated with the tasks to the respective computational units that will execute the tasks.

The data are "assigned" to computational units in the sense that the computational units now have responsibility for performing computational operations on that data. This data can remain in main memory as long as it likes. Each computational unit decides when it will bring the data onto chip and operate on the data.

One embodiment of the first aspect of the invention is that the data specify a first functionality and a second functionality. In other words, the system deals with a plurality of functionalities. The map means 104 creates the map or a plurality of maps for assigning computational tasks for the first functionality and the second functionality by spreading the data across the multiple computational units 103. The assigning comprises storing a part of the data associated with the tasks to the respective computational units that will execute the tasks.

The second aspect of the present invention relates to a method for mapping data for a multiple computational units system. The system comprises multiple computational units 103 especially for game. The method comprises the following steps. The method comprises the step for obtaining data from memory 102 (Step 101). The data specify a first functionality and the data are intended to execute on the multiple computational units system. The method comprises the step for creating a map or a plurality of maps for assigning computational tasks for the first functionality by spreading the data across the multiple computational units (Step 102).

One embodiment of the second aspect of the invention is that the data specify a first functionality and a second functionality.

For example, the system had an x86 machine with 8×86 processors in it. In the previous version of VSIPL, it will tell that there are 8 processors and try to map the map across these processors. However, it is possible that the present invention may compute it using the GPU on the graphics card in the same system. The GPU has over 256 computational units. The present invention can prepare the map to be spread across those 256 computational units NOT the 8×86 processors as those 256 computational units are the ones doing the actual work. Spreading the work across those 256 computational units and NOT the 8×86 units is NOT possible with the present version of VSIPL.

In the signal processing world, it is common that only one type of computation happens at one time. However, in the game world, it needs many different types of computation to occur at once. For example, it needs graphics, then physics, then AI, I/O all going at once. Therefore, controlling how much of the actual computation units are allocated to a particular task is important.

The maps as they are implemented only correspond to physical processors. The term, computational units, is intended to mean that does the actual computation. For example, an x86 system with 8 processors can also have a GPU installed in it with 256 CUDA units. The 256 CUDA units are the things that would do the actual computation. The CUDA units would then be the computational units. Thus the maps of the present invention would map the data across N of the CUDA units where N is equal to or less than 256. The previous version of VSIPL would only be able to MAP the data across the 8×86 processors even though there is such a powerful GPU installed into the machine. Another example would be the Cell Broadband Engine (CBE) processor. Within the CBE there is a hyper threaded (two execution threads) PowerPC Element (PPE) and 8 Synergistic Processor Elements (SPE). The previous version of VSIPL will map data across the two threads of the PPE. The present invention maps data across the 8 SPEs NOT the two threads of the PPE.

The Parallel VSIPL++ API

The central concept of the parallel VSIPL++ API is the ability to express an application's functionality independently from the specification of parallelism. The mechanism that enables this is the map.

"Maps consist of a set of compute nodes and a description of how those nodes are to be used. Objects that can have a map are called mappable"[JAMES LEBAK, JEREMY KEPNER, H. H. E. R. 2005. Parallel vsipl++: An open standard software library for high performance parallel signal processing. Proceedings of the IEEE 93, 2 (February), 313-330]. Both functions and data can be mapped to the various compute nodes. In the signal processing community, matrices, vectors, and tensors are the most often used mappable data objects.

Mapping allows the programmer to write statements like A=B+C (1) without having to worry about the mechanisms for distributing A, B, and C across the available compute nodes. Here A, B, and C are all mappable objects that have already been mapped across the compute nodes.

Because the programmer can represent the functionality independent of the parallel implementation, the code becomes much more portable. This targeting of different platforms occurs at compile time. Of the aforementioned languages, CT/RapidMind is most similar to VSIPL++. They both are embedded languages in C++. Next, they are both data parallel languages.

VSIPL++ differs from CT/RapidMind in a number of important ways. First, VSIPL++ has no runtime self optimization mechanism. Second, VSIPL++ focuses much more on the map data structure. It gives the programmer some control over how the data is distributed among the computational units. Unlike CT/RapidMind, VSIPL++, however, uses expression templates to allow multiple operations to be collected allowing for an increase in efficiency of storage and computation. VSIPL++ is the open, stable result of a standards body. Supported implementations of VSIPL++ can be purchased, but there are also freely distributed implementations that can be maintained and modified for ones own purposes. CT/RapidMind is a supported commercial product; however, it is not an open standard and not extendable by the end user.

Parallel VSIPL++ API for Games

The parallel VSIPL++ API provides numerous primitives that are useful for the signal processing community such as vector addition, matrix multiplication, and a fast Fourier transform. Many of these primitives are also useful for the gaming community; however, the key to success of any API is to provide a basis of functions that can be combined into a useful set of larger programs. To this end, the system of the present invention has implemented both a ray-triangle intersection function and a kd-tree function. These two functions are extremely useful in both the global illumination area and the physics engine area. The ray-triangle intersection function can be generalized to object-object intersection for use in a physics engine.

Contributions

This work extends the VSIPL++ API to include the brute force ray/triangle intersection function. This allows the implementation of multiple different types of global illumination algorithms across the x86, CBE, and Nvidia GPU architectures. To the best of the authors' knowledge, this is the first time that the maps data structure has been used to abstract the ray/triangle intersect implementation from the underlying parallel architecture. This is also the first time that maps have been used successfully to implement a path/tracer on 3 different architectures without changing a single line of code. This article shows the limitations of using a host/coprocessor model and discusses this limitation.

The present invention also contributes a new nested double buffering data streaming pattern for VSIPL++. This data streaming pattern can be used for any situation where there is one loop nested within a different loop.

This work also modifies the implementation of VSIPL++ to map data to computational units not to processors. Presently VSIPL++ maps across processors. It completely hides computational units from the mapping function. The present invention exposes the CBE's SPEs and the GPU's thread units as computational units. This feature is important because the game environment is different from the signal processing environment from which VSIPL++ comes. VSIPL++ was designed for an environment in which only one computational task is run at any given time. In the game environment, there could be multiple simultaneous simulations running. For example, the graphics engine could be running at the same time as the AI engine, sound engine, and physics engine. Allowing the programmer to map across the actual computational units allows him to better control the fraction of over all system resources allocated to a particular task.

Parallel VSIPL++ differs significantly from the other above mentioned high level languages. Of the above high level languages, Intel's CT/RapidMind is most similar to parallel VSIPL++. The two languages, however, differ significantly in their implementation and level of abstraction. Intel's CT/RapidMind is a slightly higher level of data abstraction than VSIPL++. Both VSIPL++ and CT/RapidMind have arrays as first-class types and use the SPMD model of parallel computing. However, CT/RapidMind's arrays are automatically distributed among the computational units by a very efficient runtime environment. VSIPL++, however, requires the programmer to use maps to specify how data should be distributed across the available computational units. Both methods have their benefits. The CT/RapidMind approach relieves the programmer from having to worry about the underlying hardware unless he wants to. While VSIPL++ requires the programmer to have an idea as to how he wants the data distributed among the computational units, it doesn't have the run time environment and is therefore less of a step away from the present programming paradigms employed by game developers now. Thus, VSIPL++ may be more easily accepted by developers.

The prevent invention contributes four main results. The prevent invention extended the VSIPL++ API with a ray/triangle intersection function, made data maps distribute across an architecture's compute units instead of just its processors as is presently done, implemented and introduced a new nested input data streaming pattern to the VSIPL++ API, and demonstrate the performance, productivity and portability of the API by implementing a Monte Carlo path tracer that can run on any one of 4 different platforms without any code modification.

First, the prevent invention extended the VSIPL++ API with a ray/triangle intersection function. This is significant as it is the basis function for many algorithms in rendering and conceptually similar to the object/object intersections used in physics. Thus, the prevent invention can implement a high level cross platform API for rendering, it is theoretically possible to do for physics. The function of the prevent invention runs on parallel x86 processors (or PowerPC processors), the Cell Broadband Engine (PS3) across multiple Synergistic Processor Elements, or on a GPU using the streaming/CUDA units of the GPU. Selection of architecture is done at compile time using a template metaprogam that selects the appropriate functions for the given architecture.

Next, the prevent invention modified how parallel VSIPL++ maps data. Presently parallel VSIPL++ maps data across system processors. This hides system coprocessors from developers. The prevent invention modify VSIPL maps to run across the actual computational units. These computational units could be from any number of different computational architecture families. For example, they could be x86 processors, the streaming units on a Graphics Processing Unit, or the Synergistic Processor Elements on a Cell Broadband Engine.

Figure 2:
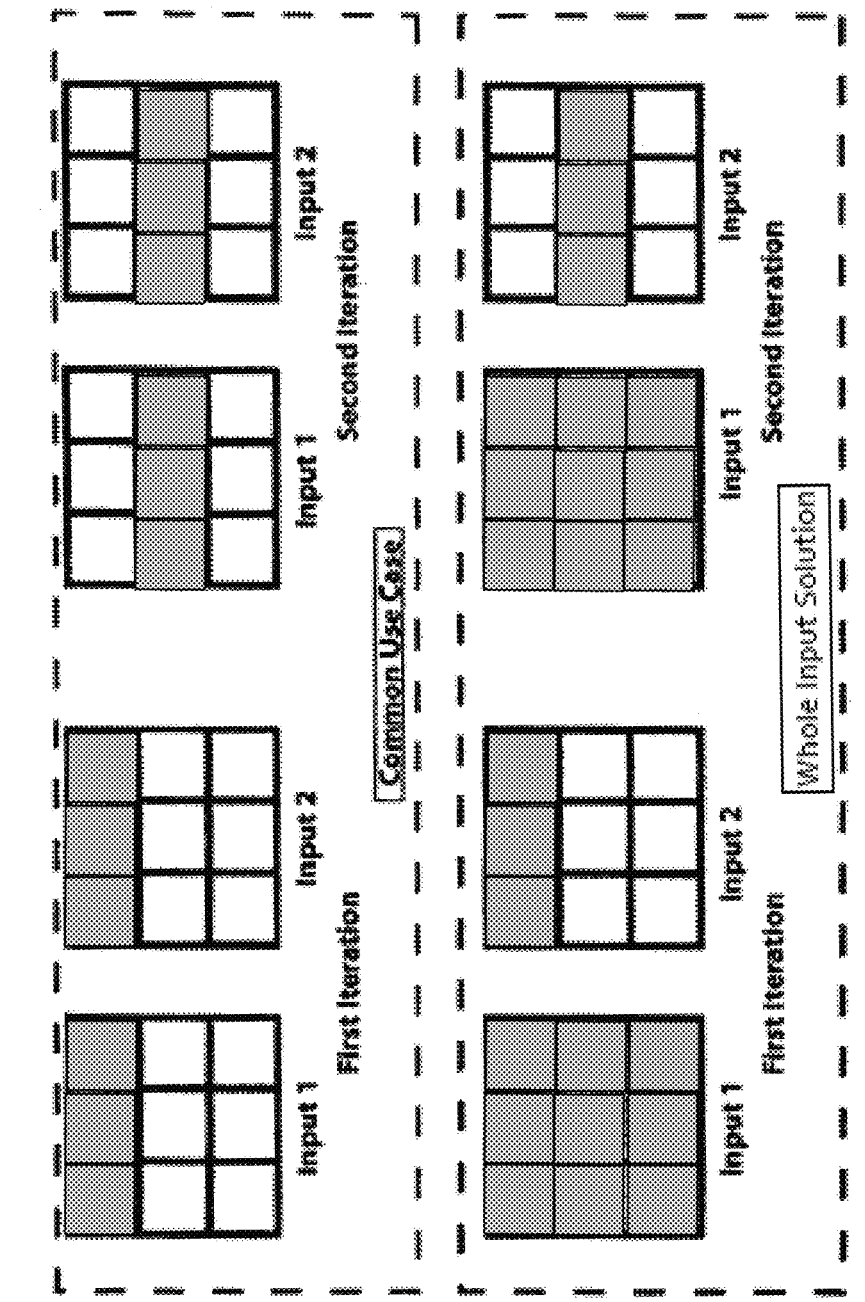
FIG. 2 shows conventional data streaming patterns.
Figure 3:
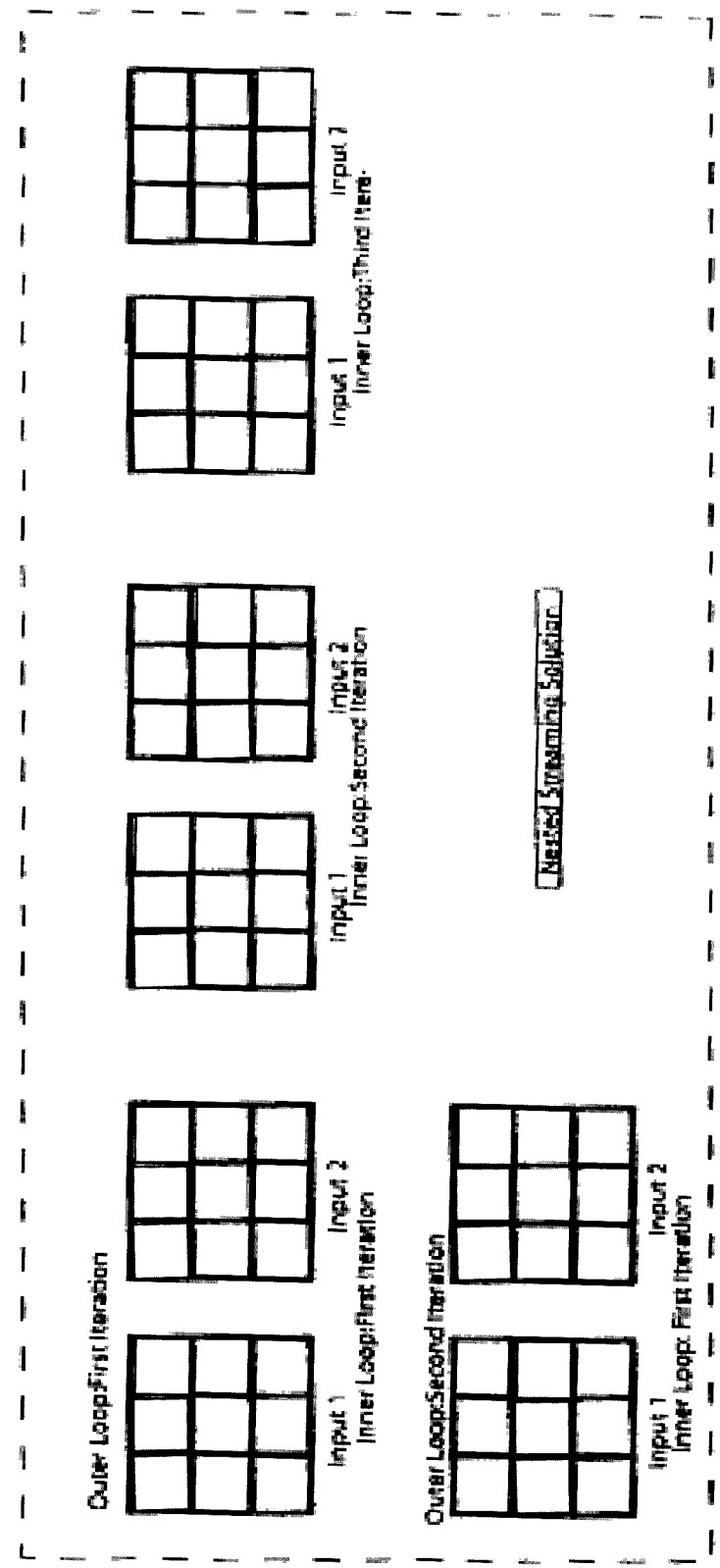
FIG. 3 shows currently proposed new streaming patterns of the present invention.

FIG. 2 shows conventional data streaming patterns. In other words, FIG. 2 provides a visualization of some streaming patterns that could already be done in VSIPL++. FIG. 3 shows currently proposed new streaming patterns of the present invention. FIG. 3 provides a visualization of the new streaming pattern for VSIPL++. A stream of data is a flow of data between processor and memory. A streaming pattern describes how big the chunks of data being streamed are and where they originate and end in memory.

Adding the ray/triangle intersection function to the VSIPL++ API required to add a new nested data streaming pattern to the API. The nested streaming pattern of the prevent invention nests one data stream inside another much like nested for loops. VSIPL++ already contains a number of different data streaming patterns. These patterns are all very useful in both the signal processing and games community, but they are not easily used for ray/triangle intersections. Included is a supplemental image "XXX" that shows three data streaming patterns. These patterns are labeled, "Common Use Case", "Whole Input Solution", and "Nested Streaming Solution." There are two Input blocks of data for each solution. These are labeled Input 1 and Input 2. The darkened blocks from each input shows which data is presently being operated on. VSIPL++ already allows implements the "Common Use Case" and a limited version of the "Whole Input Solution". The present invention implemented the "Nested Streaming Solution".

Finally the prevent invention demonstrate the effective use of a high level language to implement a useful algorithm by implementing a Monte Carlo path tracer in VSIPL++ for games and run it on 4 extremely different hardware architectures without changing any code.

Figure 4:
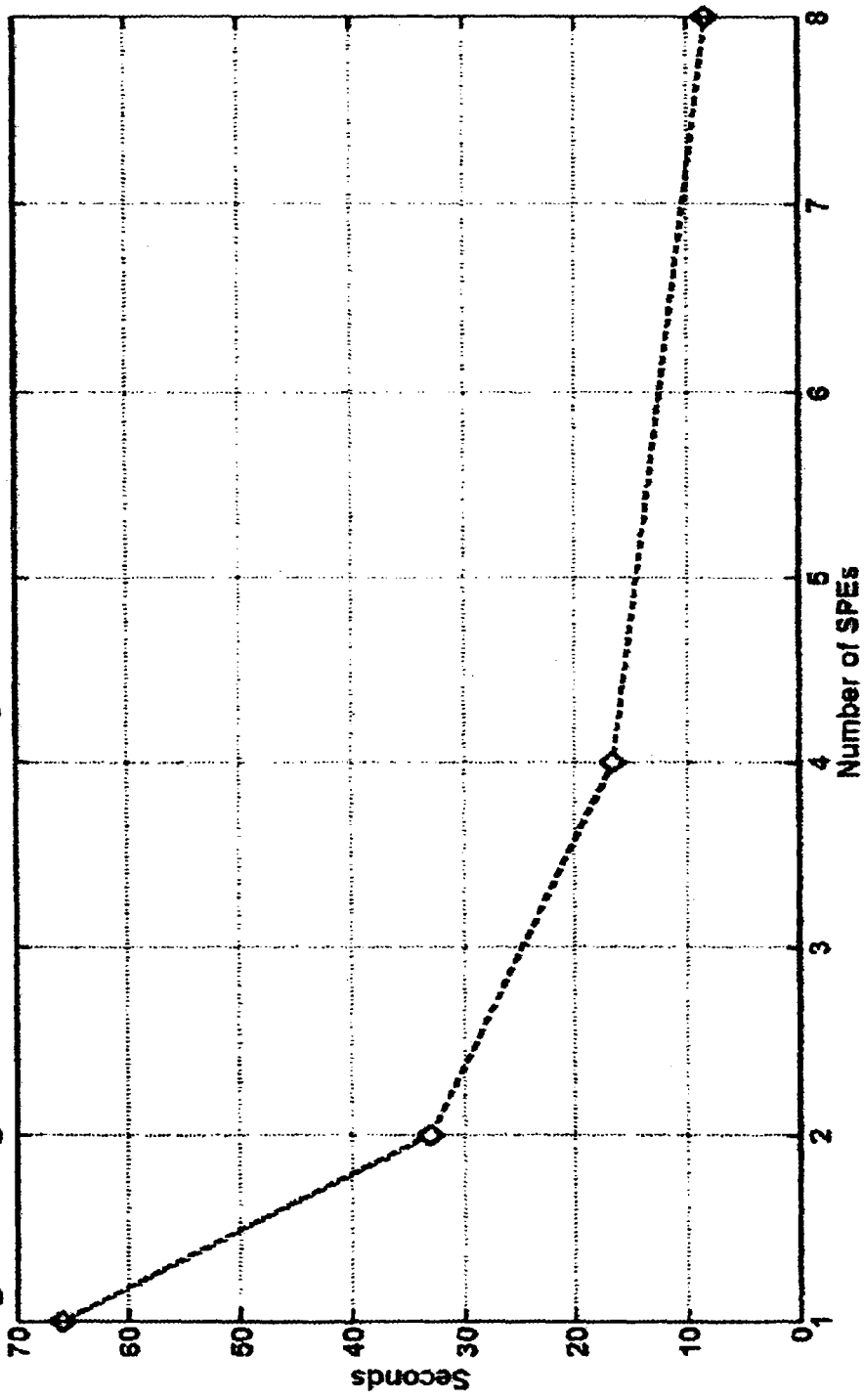
FIG. 4 shows a graph it shows Initial Cell Broadband Engine Performance Scaling results for Strong Scaling of Cell Broadband Engine on 948 triangles Stanford Bunny with 256×256 pixels. The vertical axis indicates seconds and the horizontal axis indicates Number of SPEs.
Figure 5:
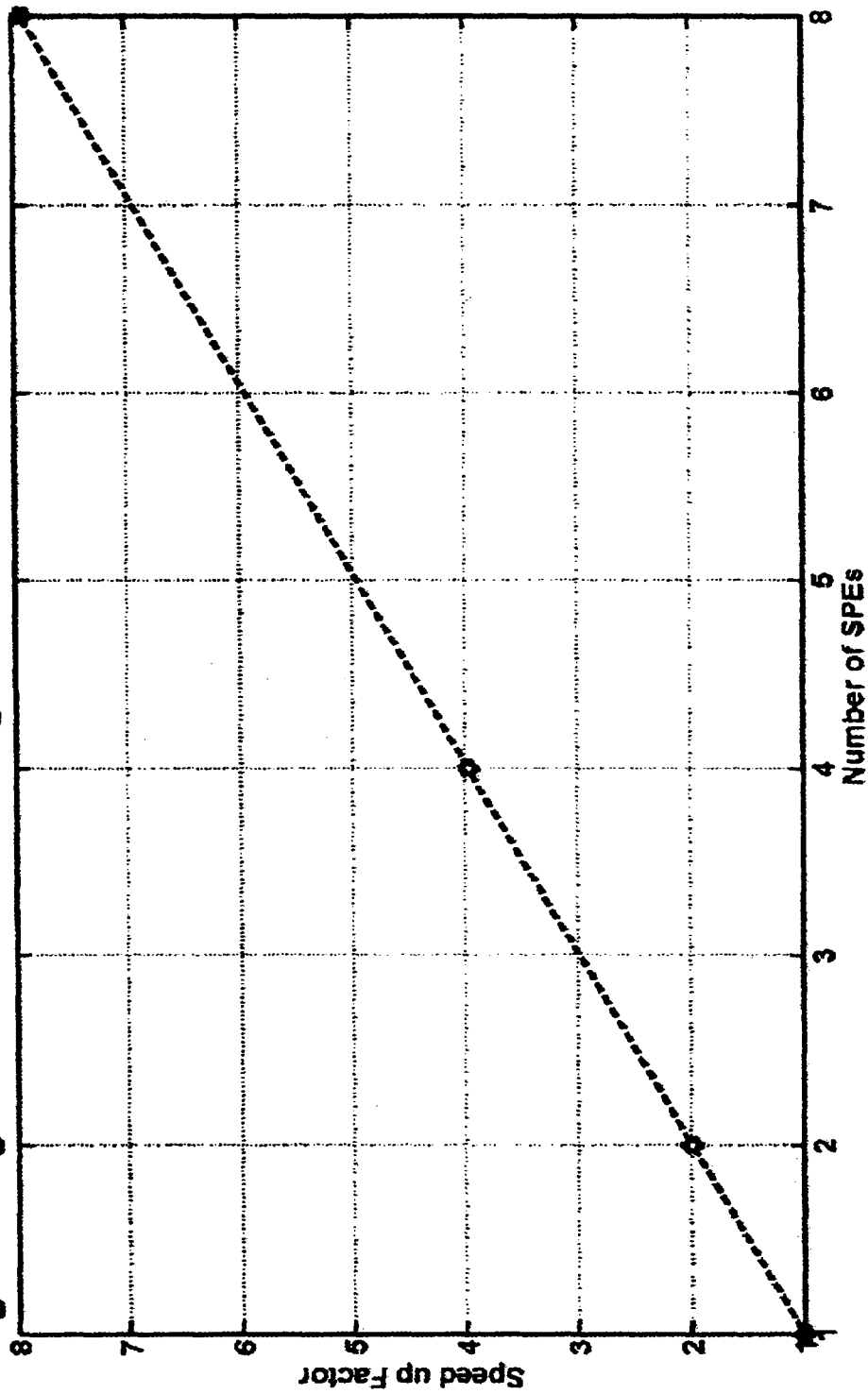
FIG. 5 shows a graph it shows Initial Cell Broadband Engine Performance Scaling results for Strong Scaling of Cell Broadband Engine on 948 triangles Stanford Bunny with 256×256 pixels. The vertical axis indicates Speed up factor and the horizontal axis indicates Number of SPEs.

FIG. 4 shows the reduction in time for a given problem size with more computational units (SPEs) on the CBE. FIG. 5 shows the speedup achieved by our system using more computational units (SPEs) on the Cell Broadband Engine (CBE).

Figure 6:
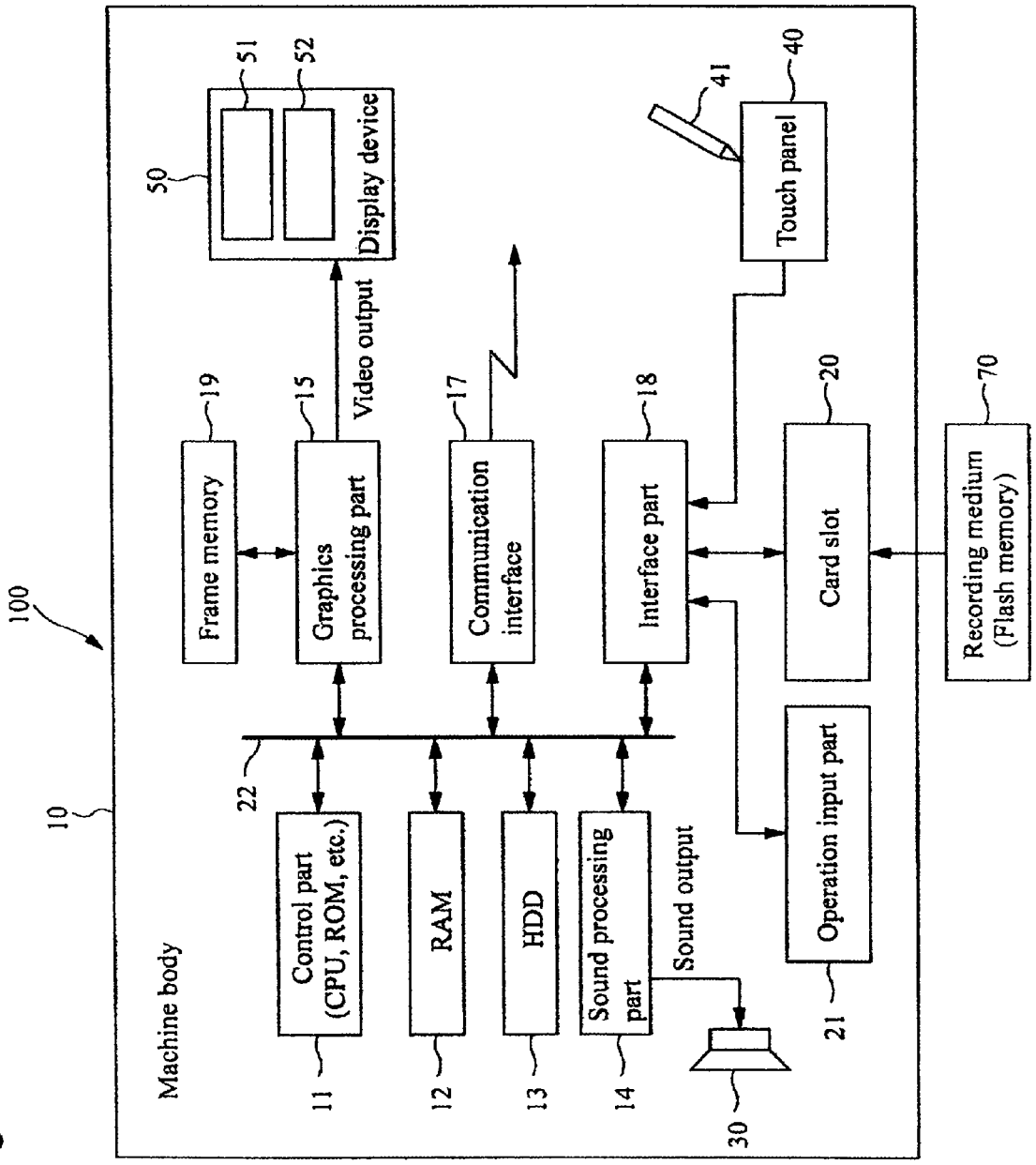
FIG. 6 is a block diagram for illustrating a configuration example of a computer shown in FIG. 1 according to one embodiment of the present invention.

FIG. 6 is a block diagram for illustrating a configuration example of a computer shown in FIG. 1 according to one embodiment of the present invention.

The operation input part 21 is composed of power switches such as a power switch and keys such as a cross key.

The circuit placed within the machine body 10 comprises a control part 11, a RAM 12, a hard disc drive (HDD) 13, a sound processing part 14, a graphics processing part 15, a communication interface 17, an interface part 18, a frame memory 19, and a card slot 20. The control part 11, the RAM 12, the hard disc drive (HDD) 13, the sound processing part 14, the graphics processing part 15, the communication interface 17, and the interface part 18 are each connected to an internal bus 22.

The control part 11, comprising a CPU, a ROM, etc., controls the entire game machine 100 in accordance with the control program stored in the HDD 13 or a recording medium 70. The control device 11 is provided with an internal timer which is used, for example, to generate timer interrupts. The RAM 12 is also used as a working area for the control part 11.

The sound processing part 14, provided with a sound input/output interface function for performing D/A and A/D conversion of sound signals, is connected to a sound output device 30 composed, for example, of a speaker. The sound processing part 14 outputs sound signals to the sound output device 30 in accordance with the sound output instructions from the control part 11 executing processes in accordance with various control programs.

The graphics processing part 15 is connected to the display device 50 has the first image display part 51 and the second image display part 52. The graphics processing part 15 distributes images to the frame memory 19 in accordance with the drawing instructions from the control part 11 and also outputs video signals for displaying the images on the image display parts 51 and 52 to the display device 50. The switching time for the images displayed according to the video signals is set to 1/30 seconds per frame, for example.

The recording medium 70 stored with programs etc. is inserted into the card slot 20. The recording medium 70 in the present embodiment is a semiconductor memory such as a writable flash memory. The communication interface 17 is connectable to another game machine 100 wired or wirelessly, and also is connectable to a communication network such as the Internet. The machine body 10 can communicate with another game machine 100 using the communication function of the communication interface 17.

The operation input part 21, the card slot 20 and the touch panel 40 are connected to the interface part 18. The interface part 18 stores, on the RAM 12, the instruction data from the operation input part 21 based on the player's (user's) operation and the instruction data based on the player's operation of the touch panel 40 using a touch pen 41 etc. Then, the control unit 11 executes various arithmetic processing in accordance with the instruction data stored in the RAM 12.

The touch panel 40 is stacked on the side of the display screen(s) of both or either of the image display parts 51 and 52. Therefore, the control part 11 recognizes input information depending on the operation inputs by a player, by managing/controlling the timing of display at the side of both or either of the image display parts 51 and 52 where the touch panel 40 is stacked, the timing of operation of the touch panel 40 using the touch pen 41 etc. and the position coordinate. The display device 50 may configure the display screen with one image display part instead of having a plurality of image display parts such as the image display parts 51 and 52.

The interface part 18 executes the processes, in accordance with the instructions from the control part 11, such as storing the data showing the progress of the game stored in the RAM 12 in the recording medium 70 which is inserted into the card slot 20, or reading out the game data at the time of interruption stored in the recording medium 70 and transferring the data to the RAM 12.

Various data such as a control program for playing a game on the game machine 100 is stored in the recording medium 70. The various data such as a control program stored in the recording medium 70 is read out by the control part 11 through the card slot 20 where the recording medium 70 is inserted and is loaded into the RAM 12.

The control part 11 executes various processes, in accordance with the control program loaded into the RAM 12, such as outputting drawing instructions to the graphics processing part 15, or outputting sound output instructions to the sound processing part 14. While the control part 11 is executing the processing, the data occurring intermediately depending on the game progress is stored in the RAM 12 used as a working memory.

CONCLUSION

This work shows a number of benefits that using the modified VSIPL++ can have over programming in standard C++. In particular, it shows that our VSIPL++ is effective in isolating the functionality of a program from its specific implementation. This allowed us to write a useful rendering algorithm (Monte Carlo path tracer) based on our implementation of VSIPL++. This is shown by the reduced lines of code needed to write the program. This application demonstrated the portability of our VSIPL++ code by running our Monte Carlo path tracer on a multi-core x86 system, a dual thread PowerPC system, a Cell Broadband Engine and an Nvidia GPU based system without having to change a single line of code. This application demonstrated that a productivity gain can be achieved by a high level API without having to resort to exotic programming languages like LISP. It shows that good performance can be achieved even with high portability.

INDUSTRIAL APPLICABILITY

The present invention may be used in the game and entertainment industry.

The invention claimed is:

1. A system for a game engine, the system comprising:
a memory storing a control program, the control program comprising an extension of an application programming interface;
a graphics processor that includes multiple computational units; and
a processor that executes the control program, the control program causing the processor to perform operations including:
obtaining data from the memory, the data specifying a first function and intended to execute on the multiple computational units, the first function including a ray/triangle intersection function;
creating at least one map for assigning computational tasks for the first function across the multiple computational units and assigning the computational tasks to the multiple computational units based on the at least one map;
storing a part of the data associated with each of the computational tasks to the respective multiple computational units that are assigned to execute the computational tasks; and
executing the computational tasks on the assigned multiple computational units based on the at least one map and the stored data,
wherein the multiple computational units comprises a first section which comprises upper row units, middle row units, and lower row units and a second section which comprises upper row units, middle row units, and lower row units,
the at least one map assigns:
first computational tasks of the computational tasks to the upper row units of the first section and the upper row units of the second section;
second computational tasks of the computational tasks to the upper row units of the first section and the middle row units of the second section;
third computational tasks of the computational tasks to the upper row units of the first section and the lower row units of the second section;
fourth computational tasks of the computational tasks to the middle row units of the first section and the upper row units of the second section;
fifth computational tasks of the computational tasks to the middle row units of the first section and the middle row units of the second section;
sixth computational tasks of the computational tasks to the middle row units of the first section and the lower row units of the second section;
seventh computational tasks of the computational tasks to the lower row units of the first section and the upper row units of the second section;
eighth computational tasks of the computational tasks to the middle row units of the first section and the upper row units of the second section; and
ninth computational tasks of the computational tasks to the lower row units of the first section and the lower row units of the second section.

2. The system in accordance with claim 1,
wherein the data that specifies the first function further specifies a second function,
wherein the at least one map assigns the computational tasks for the first function and second computational tasks for the second function across the multiple computational units, and
wherein a part of the data associated with the second computational tasks is stored to the respective multiple computational units that are assigned to execute the second computational tasks.

3. The system in accordance with claim 1, wherein the control program is an object-oriented control program.

4. The system in accordance with claim 3, wherein the application programming interface supports parallelism.

5. The system in accordance with claim 4, wherein the control program includes a ray/triangle intersection operation.

6. The system in accordance with claim 1, wherein the control program adds a nested double buffering data streaming pattern to the application programming interface.

7. The system in accordance with claim 1, wherein the extension of the application programming interface is configured to implement a Monte Carlo path tracer.

8. A method for mapping data for a game engine in a system, the system including:
a memory storing a control program, the control program comprising an extension of an application programming interface;
a graphics processor that includes multiple computational units; and
a processor, the method comprising:
executing the control program with the processor;
obtaining, with the processor, data from the memory, the data specifying a first function and intended to execute on the multiple computational units of the graphics processor, the first function including a ray/triangle intersection function;
creating at least one map for assigning computational tasks for the first function across the multiple computational units and assigning the computational tasks to the multiple computational units based on the at least one map;

storing a part of the data associated with each of the computational tasks to the respective multiple computational units that are assigned to execute the computational tasks; and executing the computational tasks on the assigned multiple computational units based on the at least one map and the stored data, wherein the multiple computational units comprises a first section which comprises upper row units, middle row units, and lower row units and a second section which comprises upper row units, middle row units, and lower row units, the at least one map assigns:

first computational tasks of the computational tasks to the upper row units of the first section and the upper row units of the second section;

second computational tasks of the computational tasks to the upper row units of the first section and the middle row units of the second section;

third computational tasks of the computational tasks to the upper row units of the first section and the lower row units of the second section;

fourth computational tasks of the computational tasks to the middle row units of the first section and the upper row units of the second section;

fifth computational tasks of the computational tasks to the middle row units of the first section and the middle row units of the second section;

sixth computational tasks of the computational tasks to the middle row units of the first section and the lower row units of the second section;

seventh computational tasks of the computational tasks to the lower row units of the first section and the upper row units of the second section;

eighth computational tasks of the computational tasks to the middle row units of the first section and the upper row units of the second section; and ninth computational tasks of the computational tasks to the lower row units of the first section and the lower row units of the second section.

9. The method in accordance with claim 8, wherein the data that specifies the first function further specifies a second function, wherein the at least one map assigns the computational tasks for the first function and second computational tasks for the second function across the multiple computational units, and wherein a part of the data associated with the second computational tasks is stored to the respective multiple computational units that are assigned to execute the second computational tasks.

10. The method in accordance with claim 8, wherein the control program is an object-oriented control program.

11. The method in accordance with claim 10, wherein the application programming interface supports parallelism.

12. The method in accordance with claim 11, wherein the control program includes a ray/triangle intersection operation.

13. The method in accordance with claim 8, wherein the control program adds a nested double buffering data streaming pattern to the application programming interface.

14. The method in accordance with claim 8, wherein the extension of the application programming interface is configured to implement a Monte Carlo path tracer.

* * * * *